United States Patent Office 3,159,429
Patented Dec. 1, 1964

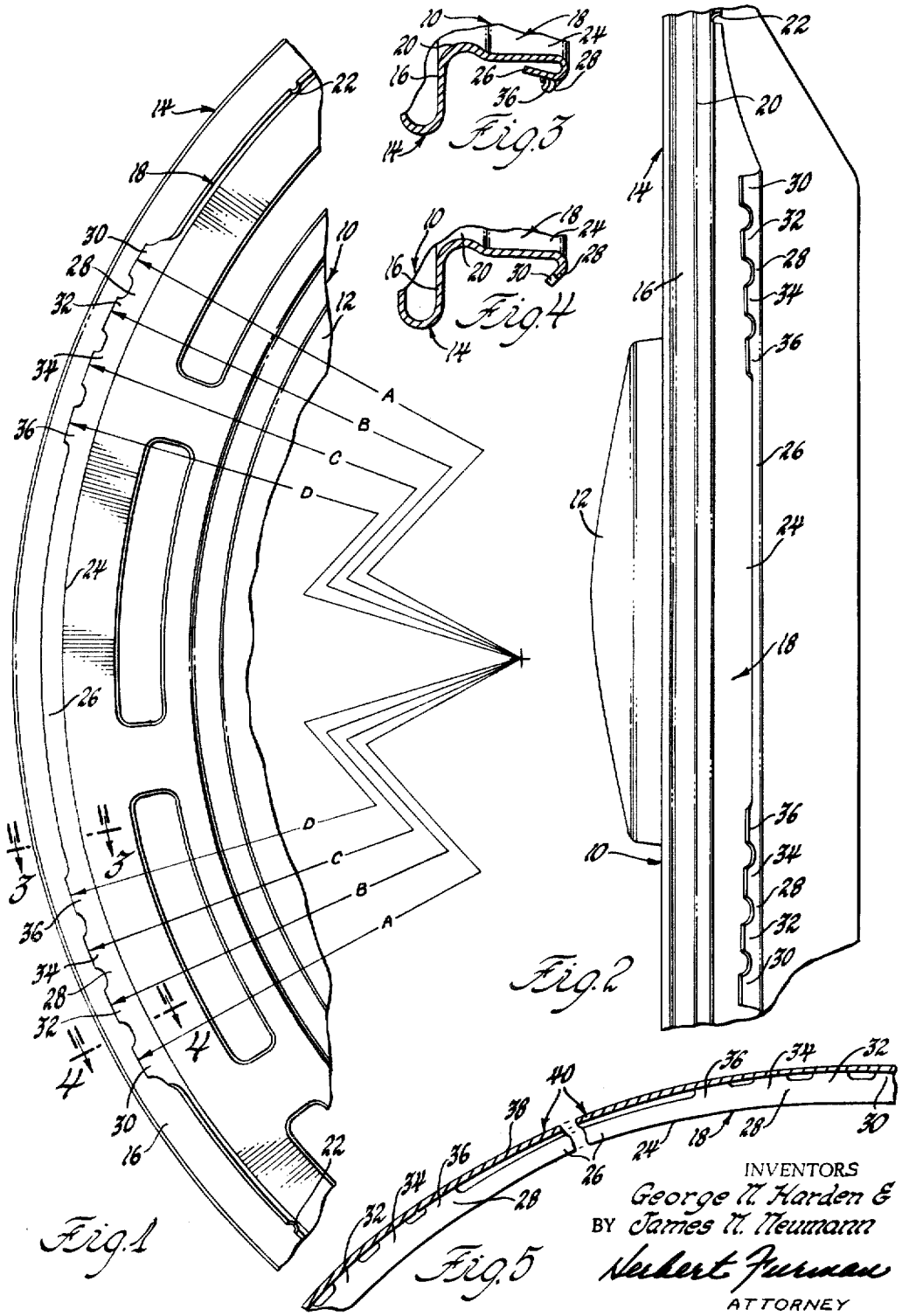

3,159,429
WHEEL COVER
George N. Harden, Walled Lake, Mich., and James N. Neumann, Grafton, Ohio, assignors to General Motors Corporation, Detroit, Mich., a corporation of Delaware
Filed Aug. 19, 1963, Ser. No. 302,985
7 Claims. (Cl. 301—37)

This invention relates to wheel covers and more particularly to a wheel cover having improved means for self-retainingly mounting the cover on a vehicle wheel.

One feature of this invention is that it provides a wheel cover having improved retaining means for mounting the cover on a vehicle wheel. Another feature of this invention is that it provides a wheel cover having a retention flange structure provided with at least two groups of retaining teeth, with the edge portions of the teeth of each group being arranged in a predetermined pattern of gradually varying radii. A further feature of this invention is that it provides a wheel cover having improved retaining means which includes a retention flange structure terminating in a return bent terminal flange separating and interconnecting a pair of return bent radially and axially outwardly extending retaining flanges, each being provided with a plurality of gripping teeth, with the edge portions of the teeth of each being arranged in a predetermined pattern to gradually varying radii. Still another feature of this invention is that it provides a wheel cover having improved retaining means including at least two circumferentially spaced groups of retaining teeth, with the teeth of each group being located on predetermined different radii, and with each tooth of each group being complementary to a tooth of the other group, and with the complementary pairs of teeth having the same radius.

These and other features of the wheel cover of this invention will be readily apparent from the following specification and drawings wherein:

FIGURE 1 is a partial rear elevational view of a wheel cover having improved retaining means according to this invention;

FIGURE 2 is a side elevational view of a portion of the cover of FIGURE 1;

FIGURE 3 is an enlarged sectional view taken generally along the plane indicated by line 3—3 of FIGURE 1;

FIGURE 4 is an enlarged sectional view taken generally along the plane indicated by line 4—4 of FIGURE 1; and FIGURE 5 is a view showing the wheel cover mounted on a vehicle wheel.

Referring now to the drawings, a wheel cover 10 according to this invention includes a cover body 12, the outer peripheral marginal portion 14 of which includes a generally radially inwardly extending continuous annular flange 16 which is joined to a plurality of generally axially inwardly extending retaining flange structures 18 across a generally radially inwardly extending continuous circumferential bead or rib 20. Four such retaining flange structures 18 are provided around the periphery of the cover 10 with each of the retaining flange structures extending approximately 90° of the circumference of the cover and being separated from the adjacent structures 18 by notches or cutouts 22. Reference may be had to Frame et al. 3,078,123 issued February 19, 1963, for more specific details of the relationship between the notches 22 and flange structures 18. The retaining flange structures 18 are each of like construction and, accordingly, only one will be described and it will be understood that the others are the same.

The retaining flange structure 18 includes an annular, generally axially inwardly extending flange 24 terminating in a generally axially and radially outwardly extending central terminal flange or flange portion 26 return bent into closely spaced adjacency to the outer surface of the flange 24, FIGURE 3, and a pair of retaining flanges or flange portions 28, each being formed into a group of teeth 30, 32, 34, 36. The flanges 28 lie on a same cone of revolution having its center at the axis of the cover 10 and axially inwardly of the cover body 12 while the flange 26 lies on a cone of revolution having its center at the axis of the cover 10 and axially outwardly of the cover body 12, as can be seen in FIGURE 3. It will further be noted that the teeth 30 of each group of teeth are the most remote teeth and that the teeth 36 of each group are the most adjacent teeth. The biting or gripping edge portions of the teeth 30, 32, 34 and 36 are each located on different radii according to a predetermined pattern with the edge portions of the teeth 30 lying on the greatest radius A and the edge portions of the teeth 36 lying on the least radius D. The radii B and C of the teeth 32 and 34 decrease with respect to each other and with respect to the radius A according to the predetermined pattern.

When the cover 10 is mounted on a vehicle wheel, the gripping edge portions of the teeth move inwardly along the axially and radially outwardly extending intermediate flange 38, FIGURE 5, of the vehicle wheel 40. Since the radii A are greater than the radius of the axially inner portion of the wheel flange 38, the flange 26 and the axially inner portion of the flange 24 are bowed or bent radially outwardly thereof approximately across the center of the flanges 24 and 26, as shown in FIGURE 5, so as to permit the cover 10 to be moved within or telescoped within the wheel 40 to its mounted position. The greatest degree of deformation in the flange 24 occurs in the axially inner portion thereof underlying the flange 26, with the degree of deformation in the flange 24 lessening axially outwardly of this portion. The flange 26 and underlying portion of flange 24 act as a spring in compression and try to return to their normal unbowed condition when the cover is not mounted on the wheel. This action of the flanges 24 and 26 biases the gripping edges of the teeth 32, 34 and 36 into a very tight gripping engagement with the annular wheel flange 38.

The gripping edges of the teeth are arranged on gradually varying radii according to a predetermined pattern, as previously mentioned. The radius A is greater than the radius of the axially inner portion of the flange 38 so that the gripping edges of the teeth 30 force the flanges 24 and 26 to become distorted when the cover is mounted on the wheel as previously described. The radii B are approximately equal to the radius of the axially inner portion of the flange 38 while the radii C and D are slightly less than this wheel flange radius so that the flange 26 and the axially inner portion of the flange 24 may distort or bow radially outwardly as shown in FIGURE 5 to a degree wherein these flanges bias the gripping edges of the teeth 32, 34, and 36 into tight gripping engagement with the wheel flange but the flanges 24 and 26 do not take a permanent set. By a proper setting of the radii A, B, C and D, these various purposes can be accomplished without distorting the flanges 24 and 26 to a degree wherein they take a permanent set and the cover 10 must be replaced.

In the specific embodiment shown, the radius A is 7.400 inches, the radius D is 7.365 inches, the radius B is 7.385 inches and the radius C is 7.3765 inches. Once the radii A and D are set, the radius B may be found according to the formula $$B = .67(A-D) + D$$

and the radius C may be found according to the formula $$C = .33(A-D) + D.$$

The radii A and D may vary within predetermined limits according to the tolerance limits under which the particular wheel cover is being manufactured.

It will be understood that each of the flange structures 18 operates in the same manner when the cover is mounted on the wheel, and the action of the flanges 24 and 26 of each of the structures 18 in trying to return to a normal undistorted and unbowed condition results in force biasing the gripping edges of all the teeth 32, 34 and 36 of the cover into tight engagement with the annular wheel flange 38 to thereby securely mount the cover in place although allowing for removal thereof whenever desired.

Thus, this invention provides a wheel cover having improved self-retaining means.

We claim:

1. A vehicle wheel cover comprising, a cover body including a generally axially extending retention flange structure, said flange structure including spaced groups of teeth having edge portions adapted to grippingly engage a portion of a vehicle wheel in order to mount said cover thereon, the edge portions of the teeth of each group being arranged in a predetermined pattern of gradually varying radial distances from the axis of rotation of the cover.

2. A vehicle wheel cover comprising, a cover body including a generally axially extending retention flange structure, said flange structure including spaced groups of teeth having edge portions adapted to grippingly engage a portion of a vehicle wheel in order to mount said cover thereon, said groups being spaced by an intervening portion of said flange structure adapted to be deformed toward said wheel when said cover is mounted thereon, the edge portions of the teeth of each group being arranged in a predetermined pattern of gradually varying radial distances from the axis of rotation of the cover, the teeth adjacent said intervening portion having the least radius.

3. A vehicle wheel cover comprising, a cover body including a generally axially extending retention flange structure, said flange structure including at least two spaced groups of generally radially and axially extending teeth having edge portions adapted to grippingly engage a portion of a vehicle wheel in order to mount said cover thereon, the teeth of one group being complementary to the teeth of the other group to arrange said teeth in respective pairs, the edge portions of the teeth of each said respective pair being located substantially the same radial distance from the axis of rotation of the cover, with the radial distance of all of said respective pairs being different.

4. A vehicle wheel cover comprising, a cover body including a generally axially extending retention flange structure, said flange structure including at least two spaced groups of generally radially and axially extending teeth having edge portions adapted to grippingly engage a portion of a vehicle wheel in order to mount said cover thereon, the teeth of one group being complementary to the teeth of the other group to arrange said teeth in respective pairs, the edge portions of the teeth of each said respective pair being located on substantially the same radial distance from the axis of rotation of the cover, the radial distances of said respective pairs being arranged in a predetermined pattern with the radial distance of the respective pair of adjacent teeth being the least and the radial distance of the respective pair of remote teeth being the greatest.

5. A vehicle wheel cover comprising, a cover body including a generally axially extending retention flange structure, said retention flange structure including a plurality of turned radially and axially outwardly extending retaining flanges, each including a plurality of teeth having circumferentially spaced edge portions adapted to grippingly engage a wheel flange to mount said cover on the wheel, the edge portions of the teeth of each retaining flange being located a different radial distance from the axis of rotation of the cover.

6. A vehicle wheel cover comprising, a cover body including a peripheral turned marginal flange structure having extending therefrom a generally radially facing and axially inwardly extending retention flange structure, said retention flange structure including a plurality of flange segments independently yieldable in radial directions and terminating in a turned radially and axially outwardly extending terminal flange, said flange being formed into at least two circumferentially spaced groups of teeth having circumferentially spaced edge portions adapted to grippingly engage a wheel flange to mount said cover on the wheel, the edge portions of the teeth of each of said groups being located predetermined different radial distances with respect to the axis of rotation of the cover, each tooth of each group being complementary to and located the same radial distance as a tooth of the other group.

7. A vehicle wheel cover comprising, a cover body including a generally radially facing and axially inwardly extending retention flange structure, said retention flange structure terminating in a return bent flange separating and interconnecting a pair of radially and axially outwardly extending retaining flanges each including a plurality of teeth having circumferentially spaced edge portions adapted to grippingly engage a wheel flange to mount said cover on the wheel, the edge portions of the teeth of each flange being arranged in a predetermined pattern of gradually varying radial distances with respect to the axis of rotation of the covers, said return bent flange being out of planar relationship to said retaining flanges.

References Cited in the file of this patent

UNITED STATES PATENTS

| | | |
|---|---|---|
| 2,624,634 | Lyon | Jan. 6, 1953 |
| 2,828,160 | Lyon | Mar. 25, 1958 |
| 3,078,123 | Frame et al. | Feb. 19, 1963 |
| 3,097,888 | Kafoure et al. | July 16, 1963 |